US 12,138,945 B2

(12) United States Patent
Boldes (Golan) et al.

(10) Patent No.: US 12,138,945 B2
(45) Date of Patent: Nov. 12, 2024

(54) METALLIC INKJET COMPOSITIONS AND PROCESSES FOR DIGITALLY PRINTING METALLIC DECORATIONS ON TEXTILE SUBSTRATES

(71) Applicant: Kornit Digital Ltd., Rosh HaAyin (IL)

(72) Inventors: Michal Boldes (Golan), Tel-Aviv (IL); Ran Eliash, Tel-Aviv (IL)

(73) Assignee: Kornit Digital Ltd., Rosh HaAyin (IL)

( * ) Notice: Subject to any disclaimer, the term of this patent is extended or adjusted under 35 U.S.C. 154(b) by 395 days.

(21) Appl. No.: 16/646,166

(22) PCT Filed: Sep. 5, 2018

(86) PCT No.: PCT/IL2018/050989
§ 371 (c)(1),
(2) Date: Mar. 11, 2020

(87) PCT Pub. No.: WO2019/049135
PCT Pub. Date: Mar. 14, 2019

(65) Prior Publication Data
US 2020/0270470 A1  Aug. 27, 2020

Related U.S. Application Data

(60) Provisional application No. 62/556,647, filed on Sep. 11, 2017.

(51) Int. Cl.
*C09D 11/322* (2014.01)
*B41J 3/407* (2006.01)
(Continued)

(52) U.S. Cl.
CPC .......... *B41M 5/0047* (2013.01); *B41J 3/4078* (2013.01); *B41M 5/0023* (2013.01);
(Continued)

(58) Field of Classification Search
CPC ..... C09D 11/322; C09D 11/023; C09D 11/54; B41J 3/4078; B41M 5/0023;
(Continued)

(56) References Cited

U.S. PATENT DOCUMENTS 7,134,749 B2  11/2006  Ben-Zur et al.
7,615,111 B2  11/2009  Oriakhi
(Continued)

FOREIGN PATENT DOCUMENTS

JP  2004169248 A * 6/2004
WO  WO 2005/115089  12/2005
(Continued)

OTHER PUBLICATIONS

International Preliminary Report on Patentability Dated Mar. 26, 2020 From the International Bureau of WIPO Re. Application No. PCT/IL2018/050989. (7 Pages).
(Continued)

*Primary Examiner* — Justin Seo
*Assistant Examiner* — Kendrick X Liu

(57) ABSTRACT

Provided herein is a water-based metallic ink composition specifically adapted for direct digital inkjet printing on non-while fabrics and textile, which affords high resolution, high gloss and high luster metallic effect (high flop index) in decorations and designs that are wash-fast and stretchable. Also provided are processes of using the metallic ink compositions with other colored ink composition in direct digital inkjet printing on textile.

6 Claims, 6 Drawing Sheets

(51) Int. Cl.
*B41M 5/00* (2006.01)
*B41M 5/50* (2006.01)
*C09D 11/023* (2014.01)
*C09D 11/102* (2014.01)
*C09D 11/107* (2014.01)
*C09D 11/54* (2014.01)
*D06P 1/44* (2006.01)
*D06P 1/52* (2006.01)
*D06P 1/673* (2006.01)
*D06P 5/30* (2006.01)
*D06Q 1/04* (2006.01)

(52) U.S. Cl.
CPC .............. *B41M 5/50* (2013.01); *B41M 5/502* (2013.01); *C09D 11/023* (2013.01); *C09D 11/102* (2013.01); *C09D 11/107* (2013.01); *C09D 11/322* (2013.01); *C09D 11/54* (2013.01); *D06P 1/44* (2013.01); *D06P 1/525* (2013.01); *D06P 1/673* (2013.01); *D06P 5/30* (2013.01); *D06Q 1/04* (2013.01)

(58) Field of Classification Search
CPC ......... B41M 5/0047; B41M 5/50; D06P 1/44; D06P 5/30; D06Q 1/04
See application file for complete search history.

(56) References Cited

U.S. PATENT DOCUMENTS

| | | | |
|---|---|---|---|
| 8,540,358 B2 | 9/2013 | Mozel et al. | |
| 8,840,745 B2 | 9/2014 | Green | |
| 2007/0103529 A1 | 5/2007 | Pearl et al. | |
| 2007/0104899 A1 | 5/2007 | Pearl et al. | |
| 2007/0281177 A1* | 12/2007 | Haubrich | B44F 1/10 427/258 |
| 2008/0257211 A1* | 10/2008 | Oriakhi | C09D 11/322 106/31.65 |
| 2008/0259100 A1* | 10/2008 | Rengaswamy | C09D 11/30 106/31.86 |
| 2009/0053415 A1* | 2/2009 | Isobe | C09D 11/03 427/256 |
| 2011/0032304 A1* | 2/2011 | Mozel | D06P 5/02 524/556 |
| 2011/0094412 A1* | 4/2011 | Proelss | C09C 1/622 241/24.1 |
| 2012/0040148 A1 | 2/2012 | Mozel et al. | |
| 2012/0274714 A2 | 11/2012 | Prölss et al. | |
| 2013/0201239 A1* | 8/2013 | Usuda | B41J 2/2128 347/14 |
| 2014/0010772 A1* | 1/2014 | Gruner | A61Q 19/00 514/769 |
| 2014/0220319 A1* | 8/2014 | Koike | B41J 2/2114 428/207 |
| 2015/0116431 A1 | 4/2015 | Ohashi et al. | |
| 2015/0152274 A1 | 6/2015 | Pearl et al. | |
| 2015/0284905 A1 | 10/2015 | Mozel | |
| 2015/0367656 A1* | 12/2015 | Denda | B41J 2/2114 347/21 |
| 2016/0207329 A1 | 7/2016 | Mann et al. | |
| 2016/0222238 A1* | 8/2016 | Arai | C09D 11/102 |
| 2017/0066937 A1* | 3/2017 | Van Rens | C09D 11/107 |
| 2017/0217213 A1 | 8/2017 | Mozel et al. | |
| 2017/0247561 A1* | 8/2017 | Nakagawa | B41J 11/0015 |
| 2017/0335123 A1* | 11/2017 | Nakamura | C09D 11/38 |
| 2017/0348978 A1* | 12/2017 | Van Garsse | B41M 5/0047 |
| 2017/0348991 A1* | 12/2017 | De Mondt | B41M 5/0064 |
| 2017/0361632 A1* | 12/2017 | Toyama | C09D 11/322 |
| 2020/0123701 A1* | 4/2020 | Okada | D06P 1/445 |

FOREIGN PATENT DOCUMENTS

| | | |
|---|---|---|
| WO | WO 2005/115761 | 12/2005 |
| WO | WO 2017/109786 | 6/2017 |
| WO | WO 2019/049135 | 3/2019 |

OTHER PUBLICATIONS

International Search Report and the Written Opinion Dated Nov. 28, 2018 From the International Searching Authority Re. Application No. PCT/IL2018/050989. (13 Pages).

Supplementary European Search Report and the European Search Opinion Dated May 6, 2021 From the European Patent Office Re. Application No. 18853886.2. (9 Pages).

Communication Pursuant to Article 94(3) EPC Dated Feb. 27, 2023 From the European Patent Office Re. Application No. 18853886.2 (7 Pages).

* cited by examiner

FIG. 2A  FIG. 2B  FIG. 2C
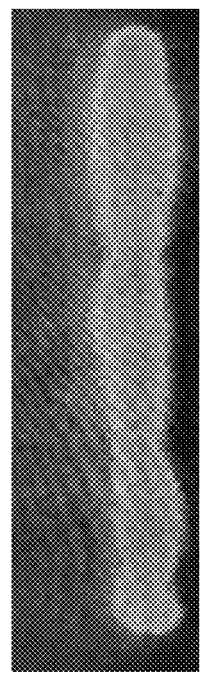
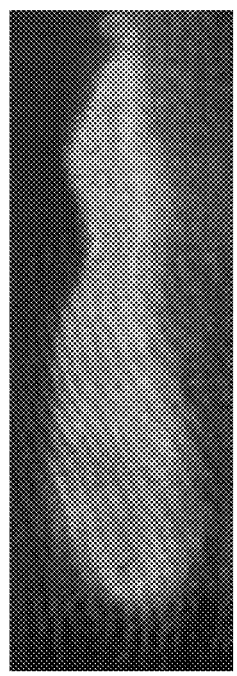
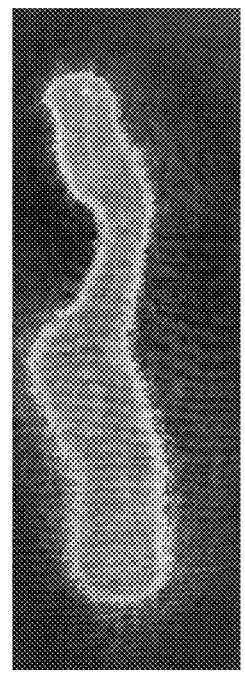
FIG. 2D  FIG. 2E  FIG. 2F  FIG. 2G
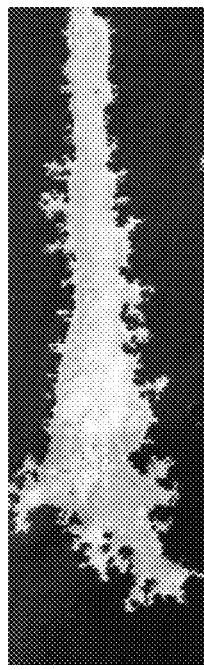
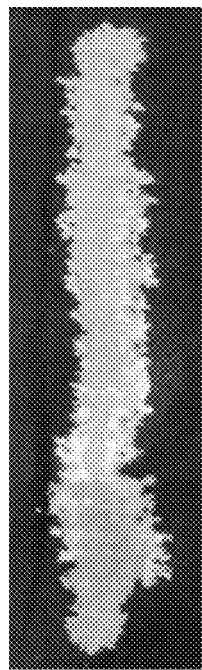
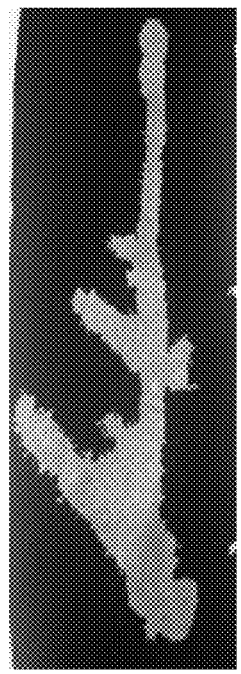
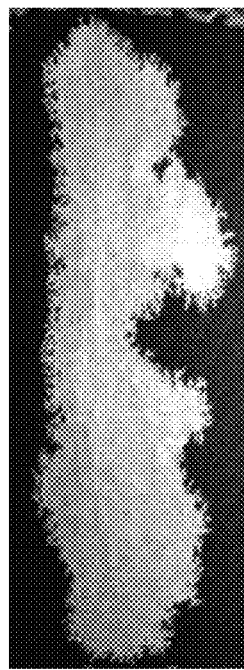

FIG. 3A
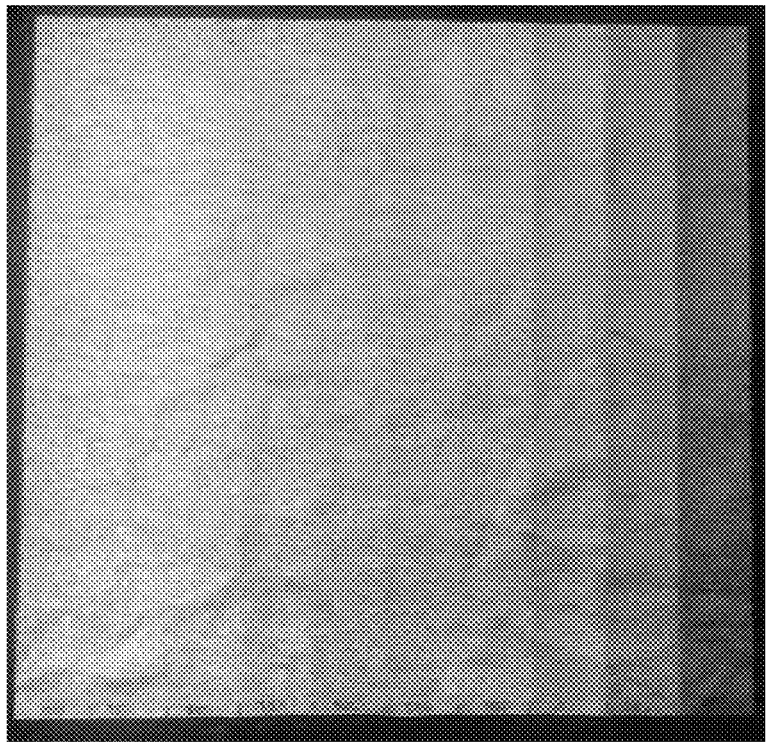
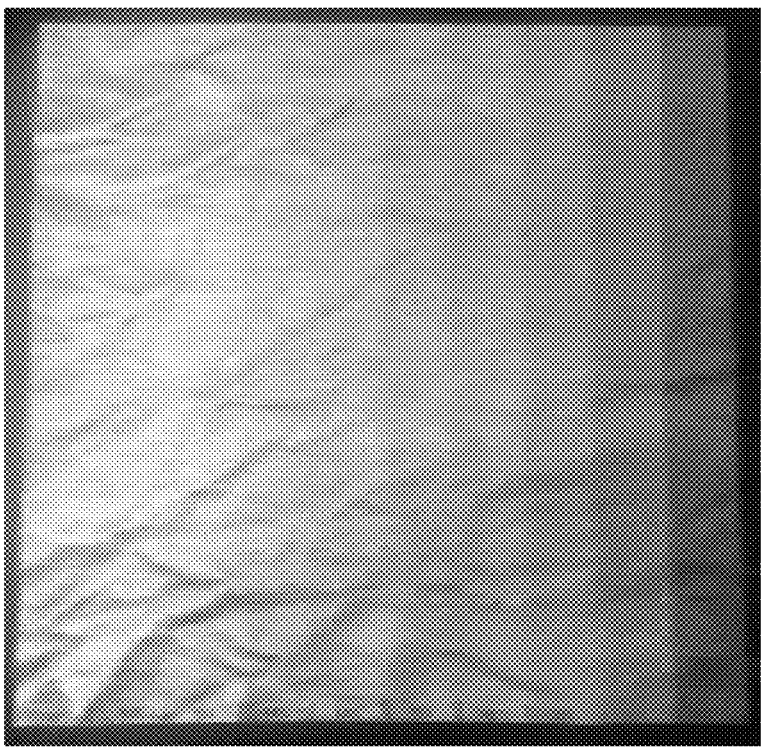
FIG. 3B

METALLIC INKJET COMPOSITIONS AND PROCESSES FOR DIGITALLY PRINTING METALLIC DECORATIONS ON TEXTILE SUBSTRATES

RELATED APPLICATIONS

This application is a National Phase of PCT Patent Application No. PCT/IL2018/050989 having International filing date of Sep. 5, 2018, which claims the benefit of priority under 35 USC § 119 (e) of U.S. Provisional Patent Application No. 62/556,647 filed on Sep. 11, 2017. The contents of the above applications are all incorporated by reference as if fully set forth herein in their entirety.

FIELD AND BACKGROUND OF THE INVENTION

The present invention, in some embodiments thereof, relates to compositions and processes of inkjet printing, and more particularly, but not exclusively, to compositions and processes for digital inkjet printing of metallic inks on fabrics.

Metallic design decorations on textile are highly sought and appreciated by fashion designers and consumers. Such metallic decorations are currently achieved by screen printing of metallic ink, screen or digital printing of an adhesive flowed by attaching of metallic foil and thermal transfer of a sticker printed on paper. However, each of these methods have one or more disadvantages, mainly concerning multiple steps and/or waste of expensive material.

Direct inkjet printing on fabrics is a robust and versatile technology which typically involves forming a film on the surface of the substrate such that the pigment particles are embedded in the film and the film is affixed to the substrate. Adherence of the film is typically achieved by forming bonds between functional groups in the substrate and corresponding functional groups in the material of the film; the film comprises binders and adhesion promoting agents, collectively referred to herein as film-forming agents. Once a "wet" film is printed on the substrate, it undergoes cross-linking which cures the film and forms the bonds with the substrate, whereas curing is typically effected by heat or other forms of energy.

Problems associated with inkjet printing liquid inks directly on absorptive substrates, such as textile and garments, have been mitigated in U.S. Patent Application Publication No. 20150152274, and PCT Application Nos. WO 2005/115089 and WO 2005/115761, by the present assignee, and which are incorporated by reference as if fully set forth herein. These documents teach a process, a composition and an apparatus for printing an image on an absorptive surface, such as an untreated (a substrate that has not been pre-treated chemically) textile piece, that includes applying a wetting composition on the surface which is capable of interfering with the engagement of a liquid ink composition with the binding sites of the surface. According to the processes taught in these patent applications, once the wetting composition is applied, the liquid ink composition is applied while the surface is still wet. Using this process, a vivid color image is formed on the absorptive surface. These patent applications, however, fail to address printing a color image on an absorptive dark surface.

Multi-part ink compositions, which are based on contacting an immobilizing composition and a colored ink composition on the surface of an untreated substrate, so as to congeal the colored ink composition on the substrate, thereby minimizing feathering and soaking thereof into absorptive substrates, are also taught in U.S. patent application Ser. No. 11/588,277 (U.S. Patent Application Publication No. 20070104899), and U.S. patent application Ser. No. 11/606,242 (U.S. Patent Application Publication No. 20070103529), all of which are incorporated by reference as if fully set forth herein.

Problems associated with inkjet printing transparent liquid inks directly on dark substrates, such as dyed textile and garments, have been mitigated in U.S. Pat. No. 7,134,749, by the present assignee, which is incorporated by reference as if fully set forth herein. This document teaches a method and an apparatus for color printing on an untreated dark textile piece which includes digitally printing, by means of an inkjet printer head, an opaque white ink layer directly onto the untreated dark textile piece, and digitally printing a colored image on the white ink layer.

U.S. Pat. No. 8,540,358, by the present assignee, which is incorporated by reference as if fully set forth herein, teaches an inkjet ink compositions for forming an image in a form of an elastic film attached to a surface of an untreated stretchable and/or flexible substrate and processes utilizing same for inkjet printing color images on various substrates such as colored and absorptive or impregnable stretchable materials, which are characterized by heightened efficiency in process time, ink and energy consumption, as well as products having durable, wash-fast and abrasion-fast images printed thereon by the process, are disclosed.

As presented hereinabove, inkjet printing on textile and other absorptive, flexible and stretchable substrates presents wide spectrum of challenges, including ink formulation suitability, image resolution, color gamut, stretchability and robustness (adhesion to the substrate, wash-fastness as well as rub-fastness).

It remains a challenge to use the abovementioned improved inkjet methodologies for direct digital printing of metallic decorations on fabrics using water-based ink formulations.

U.S. Pat. No. 9,611,401 by the present assignee provides ink compositions and processes suitable for stretchable substrates, such as textile.

U.S. Patent Application Publication No. 20110094412 provides metallic pigment for screen and gravure printing, and for solvent-based ink formulations.

U.S. Pat. No. 8,840,745 discloses a method of printing foil images on textiles.

U.S. Patent Application Publication No. 20120274714 provides inkjet printing solvent-based ink formulations containing thin aluminum effect pigments.

U.S. Pat. No. 7,615,111 discloses solvent-based metallic inkjet ink and method for forming the same.

SUMMARY OF THE INVENTION

Aspects of the present invention are drawn to water-based metallic inkjet compositions formulated for direct digital inkjet printing. In the current state of the art, metallic decoration of textile can be achieved in one in one of the following methodologies: screen printing of metallic ink, screen or digital printing of an adhesive flowed by attaching of metallic foil and thermal transfer of a sticker printed on paper. Each of these methods have at least one disadvantage, including multiple steps and or material waste. Embodiments of the present invention provide a water-based metallic inkjet composition and a process for printing metallic decorations on textile that eliminate material waste and multiple and unnecessary process steps.

According to an aspect of some embodiments of the present invention there is provided a metallic inkjet composition comprising metal particles suspended or dispersed in an aqueous medium, a metal particle dispersant, at least one emulsified proto-elastomeric film-forming agent and at least one property-sensitive agent, wherein said property-sensitive agent is sensitive to a change in a chemical and/or physical property, such that upon effecting said change, the metallic inkjet composition coagulates, and subsequently cures to form an elastic film which is characterized by a glass transition temperature ($T_g$) that ranges from −35° C. to 0° C. In some embodiments, the emulsified proto-elastomeric film-forming agent is a property-sensitive agent.

According to some embodiments of the invention, the metal of the metal particles is selected from the group consisting of aluminum, copper, zinc, tin, gold, bronze, iron, titanium, chromium, nickel, silver, steel, and any alloy and/or mixtures of thereof.

According to some embodiments of the invention, the average particle size of the metal powder ranges from 15 nm to 12 μm.

According to some embodiments of the invention, the metal particle dispersant comprises an ester of a carboxylic acid and a polyglycol ether.

According to some embodiments of the invention, the property-sensitive agent is an alkali-soluble agent.

According to some embodiments of the invention, the alkali-soluble agent is selected from the group consisting of an alkali-soluble dispersant, an alkali-soluble surfactant, an alkali-soluble polymer, an alkali-soluble coagulant and an alkali-soluble gelling agent.

According to some embodiments of the invention, the alkali-soluble agent is an alkali-soluble polymer.

According to some embodiments of the invention, the property-sensitive agent is a proto-elastomeric film-forming agent.

According to some embodiments of the invention, the proto-elastomeric film-forming agent is an alkali-soluble polymer selected from the group consisting of an alkyl-acrylic polymer and/or an emulsion, acrylic-styrene copolymer and/or an emulsion, an alkyl-acrylic copolymer and/or an emulsion thereof, and any combination thereof.

According to some embodiments of the invention, the property is a chemical and/or physical property is acidity (pH).

According to some embodiments of the invention, the change is effected by contacting the composition with a property-adjusting agent, the property-adjusting agent is an acid.

According to some embodiments of the invention, the acid is a transitory organic acid According to an aspect of some embodiments of the present invention there is provided a multi-part inkjet composition, obtainable by contacting the metallic inkjet composition presented herein with an immobilizing composition, the immobilizing composition comprises a property-adjusting agent and an aqueous medium.

According to some embodiments of the invention, the pH of the immobilizing composition ranges from 3.5 to 5.5.

According to some embodiments of the invention, the multi-part inkjet composition is further obtainable by contacting the metallic inkjet composition with the immobilizing composition and with a transparent colored inkjet composition that comprises a pigment disperses in an aqueous medium, at least one proto-elastomeric film-forming agent and at least one property-sensitive agent.

According to some embodiments of the invention, the multi-part inkjet composition is further obtainable by contacting the metallic inkjet composition with the immobilizing composition and the transparent colored inkjet composition with an opaque underbase inkjet composition that comprises an opaque white pigment disperses in an aqueous medium, at least one proto-elastomeric film-forming agent and at least one property-sensitive agent.

According to an aspect of some embodiments of the present invention there is provided an image in a form of an elastic film characterized by a glass transition temperature that ranges from −35° C. to 0° C., attached to a surface of a stretchable and/or flexible substrate, obtainable by contacting, on the substrate, the metallic inkjet composition presented herein with an immobilizing composition, and optionally with a transparent colored inkjet composition and/or optionally with an opaque underbase inkjet composition, the transparent colored inkjet composition comprises a pigment disperses in an aqueous medium, at least one proto-elastomeric film-forming agent and at least one property-sensitive agent, and the opaque underbase inkjet composition comprises an opaque white pigment disperses in an aqueous medium, at least one proto-elastomeric film-forming agent and at least one property-sensitive agent.

According to an aspect of some embodiments of the present invention there is provided a process of printing a metallic element in an image on a stretchable and/or flexible substrate, the process comprising digitally applying, by means of a plurality of inkjet printheads, onto at least a portion of a surface of the substrate, an immobilizing composition that comprises a property-adjusting agent and an aqueous medium, and the metallic inkjet composition presented herein, wherein the image is in a form of an elastic film characterized by a glass transition temperature that ranges from −35° C. to 0° C., and wherein the immobilizing composition is applied by at least one first printhead of the plurality of inkjet printheads and the metallic inkjet composition is applied by at least one second printhead of the plurality of inkjet printheads, thereby forming the image.

According to some embodiments of the invention, the time interval between an application of the immobilizing composition and an application of the metallic inkjet composition is less than 1 second.

According to some embodiments of the invention, the process further includes digitally applying, by means of at least one third printhead of the plurality of inkjet printheads, onto at least a portion of a surface of the substrate, a transparent colored inkjet composition that comprises a pigment disperses in an aqueous medium, at least one proto-elastomeric film-forming agent and at least one property-sensitive agent.

According to some embodiments of the invention, digitally applying the transparent colored inkjet composition is effected prior to, simultaneously and/or consecutively to the digitally applying the metallic inkjet composition.

According to some embodiments of the invention, digitally applying, by means of at least one fourth printhead of the plurality of inkjet printheads, onto at least a portion of a surface of the substrate, an opaque underbase inkjet composition that comprises an opaque white pigment disperses in an aqueous medium, at least one proto-elastomeric film-forming agent and at least one property-sensitive agent.

According to some embodiments of the invention, digitally applying the opaque underbase inkjet composition is effected prior to, simultaneously and/or consecutively to the digitally applying the immobilizing composition.

Unless otherwise defined, all technical and/or scientific terms used herein have the same meaning as commonly understood by one of ordinary skill in the art to which the invention pertains. Although processes, methods and materials similar or equivalent to those described herein can be used in the practice or testing of embodiments of the invention, exemplary processes, methods and/or materials are described below. In case of conflict, the patent specification, including definitions, will control. In addition, the materials, processes, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying images. With specific reference now to the images in detail, it is stressed that the particulars shown are by way of example and for purposes of illustrative discussion of embodiments of the invention. In this regard, the description taken with the images makes apparent to those skilled in the art how embodiments of the invention may be practiced.

In the images:

FIGS. 2A-G present photographs of pieces of black cotton fabric which were wetted with an immobilizing composition and then dotted with a drop of an aqueous metallic ink composition, according to some embodiments of the present invention, which was allowed to flow over the fabric at an angle, wherein the ink composition is presented in Table 3, and the type of property-sensitive emulsion is presented in Table 2;

FIGS. 3A-B present photographs of two pieces of black cotton fabric, having a 10-stripe pattern of an exemplary metallic ink composition, according to some embodiments of the present invention, "Ink 3" (FIG. 3A) and "Ink 7" (FIG. 3B) (also see Table 3), going from 10% substrate coverage on the right to 100% substrate coverage on the left in 10% increments;

DESCRIPTION OF SOME SPECIFIC EMBODIMENTS OF THE INVENTION

Figure 1A:
FIGS. 1A-G present photographs of seven vials, each containing a wetting composition, as described in Example 1 hereinbelow, into which a drop or two of a commercially available emulsion, as described in Table 1 was placed, showing the suitability of the emulsion to serve as a property-sensitive emulsion, whereas visible coagulation indicates a suitable property-sensitive emulsion, and a dispersing emulsion indicated an non-property-sensitive emulsion.

The present invention, in some embodiments thereof, relates to compositions and processes of inkjet printing, and more particularly, but not exclusively, to compositions and processes for digital inkjet printing of metallic inks on fabrics.

The principles and operation of the present invention may be better understood with reference to the figures and accompanying descriptions.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

Embodiments of the present invention provide, inter alia, water-based metallic ink compositions suitable for direct digital inkjet printing processes, which afford highly glossy and iridescent designs, which are wash-fast and stretchable, while substantially eliminating problems associated with currently used metallic decoration compositions, processes and methods.

Embodiments of the present invention are directed at a multi-component (having multiple parts, also referred to as multi-part) ink composition which comprises an immobilizing composition (part) and one or more colored ink compositions (parts) that are rendered immobilized by the immobilizing composition, while controlling and minimizing the time which passes between applying the various parts of the multi-component ink composition, the capillary action can be mitigated so as to minimize and substantially eliminate the undesirable absorption of the ink into the substrate.

Thus, the compositions and processes presented herein, according to some embodiments of the present invention, utilize specifically formulated multi-part ink compositions having compatible agents which are capable of interacting therebetween on the surface of the substrate to form an elastic film while not being absorbed into the substrate due to the combination of specific chemical formulation and particular printing process parameters, as detailed hereinbelow. According to embodiments of the present invention, the metallic ink composition includes at least a property-sensitive proto-elastomeric film-forming agent and dispersed/suspended metallic particles, whereas the property-sensitive proto-elastomeric film-forming agent causes coagulation or congelation of the ink composition upon contacting a property-adjusting agent on the surface of the substrate. The metallic ink composition, according to embodiments of the present invention, is formulated for forming metallic decorations, designs and/or images in a form of an elastic film attached to a surface of a stretchable and/or flexible substrate. The term "coagulation", as used herein, is interchangeable with the terms "congelation", "thickening" or "gelation" in the context of embodiments of the present invention, and refer to the sharp decrease in fluidity of a formerly fluid liquid. Congelation can be effected also by sedimentation, precipitation, partial solidification and partial polymerization of soluble constituents in the composition.

Once all the parts of the ink composition converge on the substrate and the printing process is complete, a thin elastic film, which constitutes the image, is formed on the substrate. As used herein, the phrase "elastic film" refers to the mechanical property and form of the image, as it is formed on the substrate from a polymerizable ink composition. This film is said to be elastic since it is formed substantially from elastomeric substances. The film, according to some embodiments of the present invention, is at least as elastic as the substrate it is affixed to.

The term "elastomeric", as used herein, refers to the mechanical properties of a rubber-like polymeric substance, which can deform under stress exerted by external forces, and can return to its original shape when the stress is removed. The elasticity of an elastomer may depend on external conditions such as temperature. Hence, according to some embodiments, the term "elastomeric" refers to mechanical properties at temperatures which are normal for human habitats, and particularly at room temperature.

Hence, the elastomeric film which constitutes the image is characterized by a low glass transition temperature ($T_g$), which allows it to form a stretchable image on a stretchable substrate at ambient conditions. The $T_g$ is the temperature below which amorphous materials, such as polymers, become stiff (glassy), and above which become pliable and elastic (rubbery).

"Thermoplastic" is another term which is used to describe polymeric substances which can reversibly go from a stiff state to an elastic state.

As used herein, the term "thermoplastic" refers to a polymer which is sufficiently soft above a certain temperature so as to readily allow plastic deformation of the polymer, and which is sufficiently stiff below a certain temperature so as to retain a desired shape. The softening of a thermoplastic polymer often occurs at temperatures near and/or above a transition temperature (e.g., a glass transition temperature, a melting point) of the polymer. Such a transition temperature may be determined, for example, by calorimetry.

The phrase "softening temperature", as used herein, refers to the lowest temperature among the glass transition temperature range of a thermoplastic polymer. Other terms used in the art for such temperature-dependent characteristic, include the melting point of the thermoplastic resin, the temperature which brings the viscosity of the thermoplastic resin to about $10^{11}$ to $10^{12}$ poises, the pour point of the thermoplastic polymer, and the minimum film-forming temperature (MFT) in the form of an emulsion of the thermoplastic polymer.

In the context of embodiments of the present invention, the relatively low $T_g$ of the finished image film attached to the substrate is lower than 0° C., or alternatively it ranges from about −60° C. to about 0° C., or from about −35° C. to about 0° C., or from about −35° C. to about −5° C.

The property of $T_g$ of the film is determined by the properties of its constituents, therefore a film which is elastic at relatively low temperatures, is formed from elastomers having a relatively low $T_g$. Hence, according to some embodiments of the present invention, the ink composition which forms can form a film which is affixed to the substrate comprises proto-elastomeric film forming constituents.

The elasticity of the elastomeric film which constitutes the image can be determined by its ability not to crack or tear when the substrate on which it is applied on is stretched. For example, an image is defined as elastic in the context of embodiments of the present invention, if maintains its shape, color composition and overall integrity (no cracks, tears or other permanent deformations) upon stretching the substrate in one direction by 30% of its original length. Alternatively, an image is defined as elastic when maintaining integrity after substrate is stretched by 50%, 75%, 100%, 150%, 200% and up to 300% for highly stretchable substrates.

Alternatively, the image is defined as characterized by an elongation percentage and a recovery percentage of elongation, when it maintains its original shape and color composition and is fully recoverable after stretching when applied on a given substrate. The elongation percentage and a recovery percentage of elongation are as defined in U.S. Pat. No. 5,874,372. Hence, the elastic image afforded according to some embodiments of the present invention, is characterized by an elongation percentage of 30% to 200% and a recovery percentage of elongation of at least 70%.

As used herein, the term "proto-elastomeric" refers to a substance which becomes elastomeric, as defined herein, under certain conditions, such as setting, polymerizing, drying, heating, curing, crosslinking and the likes. For example, crude natural rubber becomes elastomeric upon vulcanization, which is a chemical process involving heat and crosslinking with sulfur. In the context of embodiments of the present invention, a proto-elastomeric substance may be found in a dispersed form, a dissolved form or as an emulsion, and in the process of polymerization, self-crosslinking, crosslinking via a crosslinking agent, drying and/or curing, becomes the elastomeric substance which is left attached on the surface of the substrate.

The phrase "film-forming agent", as used herein, refers to a bonding/binding agent (binder) which polymerizes, cross-links to itself or crosslinks via a crosslinking agent, and affords a film or a layer upon application, optionally upon drying and curing thereof on a surface. As known in the art, film-forming agents are a group of chemicals that afford a pliable, stretchable, cohesive, and continuous or semi-continuous covering film or layer over a surface when applied thereon and allowed to undergo a chemical or physical transition. The chemical or physical transition may be setting, polymerizing, drying, heating, curing, crosslinking and the likes. The phrase "film-forming agent", encompasses coating agents, binders, adhesives, adhesion-promoting agents, resins, polymers, co-polymers and the like collectively.

In some embodiments, the metallic inkjet composition presented herein includes a dispersed or suspended metal particles and a property-sensitive agent, wherein the property-sensitive agent is selected capable of causing congelation of the composition upon contacting a property-adjusting agent, as these agents are discussed hereinbelow. Without being bound by any particular theory, it is noted that the property-sensitive agent losses its solubility in the carrier of the ink composition (the property-sensitive agent is rendered insoluble in the carrier) upon contacting the property-adjusting agent, at least to some extent that is sufficient to cause congelation/coagulation of the ink composition.

Ink coagulation can be afforded, according to some embodiments, by adding to the metallic inkjet composition one or more alkali-soluble property-sensitive agents (e.g., acid-sensitive or metal oxide-sensitive coagulants/agents), polypeptide-based property-sensitive agents (e.g., acid-sensitive coagulants/agents) and polysaccharide-based property-sensitive agents (e.g., divalent metal cation-sensitive coagulants/agents), or a combination thereof. According to some embodiments of the present invention, the property-sensitive agent is an alkali-soluble agent or an acid-sensitive agent.

In some embodiments, the property-sensitive agent is an alkali-soluble agent, which can be associated with dispersing the metal particles, an alkali-soluble agent that is not associated with dispersing the metal particles, or a combination thereof. For example, a property-sensitive surfactant, dispersing agent or hydrophilic moiety can be alkali-soluble, wherein such an alkali-soluble surfactant, dispersing agent or the chemical attached hydrophilic moiety is sensitive to a decrease in pH, such as effected in the presence of an acid, whereupon contact an acid, the metal particle is no longer dispersed in the carrier, causing the ink composition comprising the same to coagulate (undergo sharp increase in viscosity).

In embodiments wherein the surfactant, dispersing agent or the chemical attached hydrophilic moiety are property-sensitive, they are regarded as a part of the property-sensitive agent required in the ink composition, according to embodiments of the present invention. In some embodiments, the amount of the property-sensitive agent required in the metallic inkjet composition presented herein is determined and set regardless of the dye dispersing agent or the chemical attached hydrophilic moiety on the dye molecules.

In general, an emulsion or a dispersion that includes a property-sensitive agent and that can serve as a dispersant for the metallic ink composition provided herein, is referred to as a property-sensitive emulsion or as a property-sensitive dispersion, respectively.

In some embodiments, the property-sensitive agent can serve as an emulsified proto-elastomeric film-forming agent in the metallic ink composition provided herein, namely one ingredient that exhibits at least these two functions. Inversely, in some embodiments, the emulsified proto-elastomeric film-forming agent can serve as the property-sensitive agent in the metallic ink composition provided herein. Hence, in some embodiments the ink may include two different ingredients, one that functions as a property-sensitive agent and confers the coagulation for immobilization feature, and another ingredient that confers the elasticity of the resulting film (image), and in some embodiments, the two functions are conferred by one ingredient.

In the context of the present invention, a property-sensitive agent, of which the property is pH, and is sensitive to acid such that it causes coagulation of the metallic inkjet composition upon contacting an acid, is also referred to as an alkali-soluble agent. According to embodiments of the present invention, alkali-soluble agents include alkali-soluble dispersants, alkali-soluble surfactants, alkali-soluble polymers, alkali-soluble coagulants and alkali-soluble gelling agents.

According to some embodiments, the alkali-soluble agent is an alkali-soluble polymer, such as, for example, an alkali-soluble acrylic polymer or alkali-soluble co-acrylic polymer such as poly(styrene/acrylic acid) polymer. It is noted herein, without being bound by any particular theory, that alkali-soluble acrylic or co-acrylic polymers are rendered soluble in alkaline conditions under-which the carboxylic groups in the polymer are charged; whereupon acidification of the aqueous medium containing the alkali-soluble polymer, the charged groups become neutral, leading to loss of solubility in aqueous media. In some embodiments, the alkali-soluble property-sensitive agent is selected from the group consisting of an emulsified polyurethane, a polyurethane polymer, a polyether polymer, a polyester polymer, a polyacrylate polymer, a polyvinyl chloride polymer, a polyvinyl acetate polymer, a polyvinyl butyral polymer, an aminosilicon polymer and any salt, co-polymer or combination thereof. Commercially available alkali-soluble polymers include Joncryl 586, Joncryl 678, Joncryl 96, Joncryl 296 and Joncryl 538.

According to some embodiments of the present invention, the pH of the metallic inkjet composition is maintained above neutral pH, namely the pH of the ink composition is higher than 7, higher than 7.5, higher than 8, higher than 8.5, higher than 9, higher than 9.5, higher than 10, higher than 10.5, or higher than 11. The pH of the ink composition can be set by the amount of all the alkali species therein, and can be further maintained at a desired level by use of an alkali pH-adjusting agent, such as a base of a buffer. Typically, the pH can be set to alkali levels by use of organic amines and/or ammonium hydroxide.

According to some embodiments of the present invention, the immobilizing composition is formulated to carry and deliver a property-adjusting agent to the substrate, and does not contain a colorant and is thus substantially transparent and colorless, and intended not to leave a distinguishable mark on the substrate. Thus, according to some embodiments of the present invention, the immobilizing composition is essentially devoid of a colorant, pigment and/or dye.

The mechanical properties of the immobilizing composition presented herein are correlated, at least to some extent, to the properties of the liquid applicator used to apply the composition on the substrate. Suitable applicators include high-output capacity spray nozzles that are typically used to cover relatively large area of the substrate at relatively low resolution, and inkjet printheads, the latter being more delicate and complex and used for accurate drop placement (high resolution) at relatively low-output capacity. For simplicity, the term "nozzle" is used herein to refer to the high-output low resolution liquid applicator, and the term "printhead" is used to refer to the low-output high resolution liquid applicator. Output capacity may also be affected by the relative speed by which the applicator moves over the substrate (or the substrate moves under the applicator) during the printing process, however the output capacity is determined while taking that relative motion into account by reporting the total amount of liquid that is being delivered to a unit area at a unit time. A typical printhead delivers ink according to the varied digitized color requirements at any given image segment ("pixel"), pallet motion and printhead frequency, while a typical spray nozzle delivers constant amount under constant pressure of liquid over time, varied by pallet motion. For an exemplary comparison, a spray output capacity of a nozzle ranges about 4-5 grams per square inch at a pressure of about 1.5 bar, while the jetting output capacity of a printhead ranges about 0.002-0.05 grams per square inch. For example, for 600 DPI prints (360,000 pixels in square inch), using 4 pl drop for one pixel, the spray output capacity translate to about 1.44* µl per square inch or about 1.44 mg per square inch, and for using 80 pl drops, about 0.03 grams per square inch.

The immobilizing composition presented herein is formulated so as to be suitable for application thereof in-line of an inkjet printing process. In other words, the immobilizing composition is designed to be applied directly on the substrate as part of the printing process rather than a pretreatment step before the printing process, which can take place off-line of the inkjet printing process. Such formulation incurs some limitations of the immobilizing composition, particularly in the sense that the composition is required to be suitable for inkjet applicators that form a part of the inkjet machinery, and particularly the parts that involve direct inkjet printing.

According to some embodiments, when the immobilizing composition is designed to be applied (sprayed) by a nozzle, its ingredients are selected and/or treated such that the composition exhibits (characterized by) at least one of the following attributes:
- a maximal particle size of less than 200, 150, 100, 50, 25, 10 or 5 microns;
- a dynamic viscosity at shear that ranges from 2 to 400 centipoises;
- a room temperature Brookfield viscosity less than 400 centipoises;
- a surface tension that ranges from 15 to 70 mN/m; and
- an electrical resistance of 50 to 2000 ohm per centimeter.

According to some embodiments, when the immobilizing composition, as well as the metallic inkjet composition, is designed to be applied (jetted) by a printhead, its ingredients are selected and/or treated such that the composition exhibits (characterized by) at least one of the following attributes:
- a maximal particle size of less than 1, 5, 10, 12 or 15 microns;
- a dynamic viscosity at shear that ranges from 2-25 centipoises;
- a printing temperature Brookfield viscosity less than 25 centipoises;
- a surface tension that ranges from 24 to 40 mN/m; and
- an electrical resistance of 50 to 2000 ohm per centimeter.

According to some embodiments of the present invention, the immobilizing composition, as well as the metallic inkjet composition, is a water-based composition, and the immobilizing composition carrier is an aqueous carrier, or water.

One of the objectives of using an immobilizing composition containing a property-adjusting agent as one (first) part, and an ink composition containing property-sensitive agent in a separate (second) part, is to provide the means to immobilize (coagulate, congeal etc.) the ink composition only upon contacting the two parts on the surface of the substrate and not beforehand, thus avoiding clogging of the delicate elements of the printing machine. The property-adjusting agent is selected such that it effects a change in the property-sensitive agent, thereby effecting congelation of the ink composition.

The term "property" in the context of a "property-adjusting agent" or a "property-sensitive agent", as used herein, refers to a chemical and/or physical property of an ingredient in the ink composition that is sensitive to the presence or to an increase in the amount of the property-adjusting agent—a sensitivity that is expressed inter alia by losing the ability to stay liquid, dissolved, dispersed or emulsified. In other words, the presence or an increase in the amount of the property-adjusting agent causes a property-sensitive agent in the ink composition to break the suspended or the emulsified state of the ink composition (dispensability), leading to immobilization thereof. Representative examples of such properties include, without limitation, acidity (pH), metal atom complexation (metal ion concentration), ionic strength and hydrophobicity.

Hence, the phrase "property-adjusting agent" as used herein refers to a component in the immobilizing composition that can affect the immobilization of an ink composition comprising a property-sensitive agent, such that when the immobilizing composition and the ink composition come in contact and combine, the ink composition coagulates/congeals. For example, an acid, acting as a property-adjusting agent in the immobilizing composition, will change pH level of the ink composition, causing a pH-sensitive agent therein to precipitate, thereby causing the ink composition to coagulate/congeal. By effecting a change in one or more such properties, the property-adjusting agent is causing the property-sensitive agent to undergo a chemical and/or physical change (such as coagulation/congelation), as discussed herein. Hence, in some embodiments, a metal-ion-ligand complexation, a sharp change in the ionic strength, a sharp change in the hydrophobicity or a sharp change in the electric charge/valency of the ink composition, will cause it to coagulate/congeal. Exemplary property-adjusting agents include acids, metal oxides and divalent metal cations.

According to some embodiments, the metal oxide is present in the composition as a solute, a colloid or suspension. Exemplary metal oxides that can be used as a property-adjusting agents include alumina and titania.

According to some embodiments, the divalent metal cation is present in the composition as a solute, namely a cation of a dissolved salt. Exemplary divalent metal cations that can be used as a property-adjusting agents include $Ca^{2+}$, $Cu^{2+}$, $Cd^{2+}$, $Pb^{2+}$, $Fe^{2+}$ and $Mn^{2+}$, stemming from salts such as, for example, $CaCl_2$, $CdCl_2$, $Pb(NO_3)_2$, $FeCl_2$, $MnCl_2$ and $CuCl_2$.

An exemplary property is a pH-dependent dispensability and ionic-strength-dependent dispensability, also referred to herein as "alkaline dispensability", wherein the change in pH (the aforementioned acidity or alkalinity property) or the ionic-strength of a solution changes the dispensability of one or more of its dispersed species. Similarly, there exist inter-dependency between metal ion complexation combined with pH, and the capacity to stay dispersed/emulsified, and such interdependency is discussed in detailed hereinbelow. A property-adjusting agent that acts by adjusting the pH of the environment of a pH-sensitive agent, is therefore a pH-adjusting agent.

According to some embodiments of the present invention, the pH of the immobilizing composition is acidic due to the nature of the property-adjusting agent, being an acid. In such embodiments, the pH of the immobilizing composition is lower than 6.5, or ranges about 2-6, or about 2-5, or about 2-4. Optionally, the pH of the immobilizing composition ranges about 3-6, 4-6 or 5-6. The immobilizing composition may or may not contain a buffering agent. According to some embodiments, an immobilizing composition may be buffered by a suitable salt or weak base, such as ammonia/ammonium base or another volatile amine, to ensure the desired pH range while not leaving undesired traces on the substrate. Buffering may be accomplished by a buffering agent, such as, but not limited to a weak amine such as tris(hydroxymethyl aminomethane), also referred to as Tris or THAM.

Almost any small molecule acid, organic acid or polymeric acid will cause an ink composition containing a pH-sensitive agent to coagulate/congeal, and some acids might be more preferable for use in some embodiments and printing conditions and tasks. Less favorable acids include acids that impart a noticeable odor, or may burn-out the substrate, or leave a stain in the substrate, or cause a dye in the ink composition or the substrate to migrate or otherwise be diminished. According to embodiments of the present invention, pH-adjusting agents include glycolic acid (volatile), acetic acid (volatile with some vinegar odor), lactic acid (dimerized at elevated temperatures), malic acid, ascorbic acid, maleic acid, benzoic acid and several polymeric acids (acidic polymers).

Exemplary acidic polymers, which can be used beneficially as polymeric property-adjusting agent in the context of embodiments of the present invention, include, without limitation, polyacrylic acid, acidic alkoxylated polymer, poly(2-acrylamido-2-methylpropanesulphonic acid), poly(acrylic acid-co-maleic acid), poly(butadiene-co-maleic acid), poly(ethylene-co-acrylic acid), polymaleic acid, poly(methacrylic acid), poly(4-styrenesulfonic acid-co-maleic acid), and any mixture thereof.

In some embodiments of the present invention, the immobilizing composition may include one or more property-adjusting agents in a total amount that ranges from about 0.1% to about 30% of the total weight of the composition, or 0.5-15%, 0.5-10%, 0.1-5%, or 0.5-4%, or 0.5-3%, 1-6%, or 1-4%, or 1-3%, or 1-2% property-adjusting agent of the total weight of the immobilizing composition. If one or more property-adjusting agent is utilized, each property-adjusting agent may be present in any ratio between 0 and 100% comprising the blend as long as the total amount of the property-adjusting agent in the immobilizing composition is within the desired range.

In some embodiments of the present invention, the immobilizing composition is essentially devoid of a film-forming agent.

According to some embodiments of the present invention, the property-adjusting agent is an acid, and the property it adjusts is pH, and more specifically, the property-adjusting agent is an acid that lowers the pH of the ink composition upon contact, thereby causing it to coagulate as a result of the effect of acid on the property-sensitive proto-elastomeric film-forming agent. Although most acids will cause a pH-sensitive proto-elastomeric film-forming agent to cause coagulation of the ink composition, some acids are more suitable for the ink composition presented herein, which is formulated for direct digital inkjet printing, particularly on textile application.

One exemplary acidic property-adjusting agent is an organic acid. According to some embodiments, the organic acid is a carboxylic acid. Suitable organic acids include, but are not limited to a carbonic acid, a formic acid, an acetic acid, a propionic acid, a butanoic acid, an $\alpha$-hydroxy acid such as glycolic acid and lactic acid, a halogenated derivative thereof and any combination thereof.

The selection of a suitable property-adjusting agent in the form of an acid should take into account several factors, namely the corrosive nature of acids on the fabric as well as on the delicate parts of the printing apparatus and particularly the printheads and other metallic and otherwise delicate parts of the printing machine which corrode easily, as well as the tendency of acids to scorch and degrade certain substrate materials over time. Hence, the acid should be effective enough to cause the desired property-adjusting effect, mild enough so as not to generate damage to the machinery and/or garment, and transitory so as not to degrade the finished product.

According to some embodiments of the present invention, acids which may be neutralized by heat are jointly referred to herein as transitory acids. Hence, the phrase "transitory acid", as used herein, refers to an acid which can be rid of by the virtue of being volatile or intra/cross-reactive to form essentially neutral species.

While evaporation is one mechanism by which heat can reduce the presence of a volatile acid, heat can also reduce acidity in other ways. Some acid compounds may exhibit pH variability over a range of physical conditions, such as temperature. For example, some organic acid compounds may undergo a chemical reaction, such as condensations, upon applying heat to the composition. This chemical reaction ultimately leads to loss of the acidic property and an elevation and neutralization of the pH in the finished product after curing, which typically involves heating.

It is noted herein that in general alpha-hydroxy acids are suitable as a transitory acid according to some embodiments of the present invention.

For example, lactic acid may be used to bring the pH of an aqueous solution to about 2-3 (pKa of 3.8 at 25° C. in water), but when heated above 100° C. in dehydrating conditions, lactic acid molecules react with one-another to afford the neutral and stable lactone specie known as lactide, which is the cyclic di-ester of lactic acid. Lactide may undergo further transformation and participate in the polymerization reaction on the substrate, as lactide is known to lead to the formation of PLA, poly-lactic acid polymers and co-polymers.

Another example for such a transitory acid is glycolic acid, which forms the cyclic and neutral lactone 1,4-dioxane-2,5-dione.

Transitoriness is required when it is desirable to have little or no traces of an acid in the final product. Therefore acid traces should be reduced before or during the curing step of the process (effected typically at 140-160° C.), and can no longer damage the substrate. On the other hand, the fumes of too-volatile acid will seep into the orifices, at print off-time, reacting with the other parts of the ink composition, causing immediate printhead blockage, and in longer time terms will cause corrosion of sensitive elements of the printing machine and the environment. Another factor is the worker's health which may be adversely effected by highly volatile acid such as formic acid. In addition, some volatile acids cause noxious or unpleasant odor even if minute reminiscence thereof is left in the finished product. Some volatile acids leave a distinct and mostly unpleasant odor, and therefore should be disfavored as noxious odor may affect the work place as well as cause malodor of the product at the end-user side. Hence, an odorless volatile or otherwise transitory organic acid should be selected when possible. Exemplary transitory organic acids which can provide all the above advantages with minimal disadvantages include, but are not limited to, lactic acid and glycolic acid.

According to some embodiments, the acid is acetic acid, glycolic acid and/or lactic acid.

The presently described metallic ink composition is designed to be compatible with inkjet machinery, and particularly with inkjet printheads. In addition, the presently described metallic ink composition is formulated with a property-sensitive agent for instant coagulation and immobilization upon contacting an immobilizing composition that is formulated with a property-adjusting agent.

An exemplary metallic ink composition, according to some embodiments of the present invention, is formulated as follows:
  1-30 wt. % a metal particles dispersion having 10-35% metal particles;
  0-40 wt. % (optional) anti-corrosion additive;

20-65 wt. % proto-elastomeric film forming agents ($T_g$ ranging −60° C. to 0° C., or −35° C. to 0° C.) which may also be property-sensitive;

0-15 wt. % (optional) supplemental property-sensitive agent 15-45 wt. % humectant (glycols mixture);

0.5-10 wt. % crosslinking agent;

0.1-1 wt. % bactericide/fungicide;

0-1.5 wt. % optional blocked acid catalyst;

0-0.8 wt. % optional neutralizing/buffering agent;

0-1 wt. % optional anti-foaming agent (defoamer);

0-2 wt. % optional wetting agent/surfactant;

0-5 wt. % optional organic solvent;

0-2 wt. % other optional additives; and

Deionized water to QS (to 100%);

wherein the composition is characterized by a viscosity at room temperature of 2-25 cP; a pH that ranges 7-9.5, and a surface tension that ranges 24-40 N/m.

According to some embodiments, the metal particles dispersion includes a metal powder having an average particle size that ranges 15 nm to 12 μm or 15 nm to 5 μm, or 20 nm to 2 μm, or 30 nm to 1 μm, or 1 μm to 12 μm. According to some embodiments, the metal particles (metal powder) in the dispersion have a size of 1 μm to 12 μm in diameter and 30 nm to 150 nm in thickness.

According to some embodiments, the metal is aluminum, copper, zinc, tin, gold bronze, iron, titanium, chromium, nickel, silver, steel, and any alloy thereof and/or mixtures of these metal powders. In some embodiments, the metal is aluminum.

According to some embodiments, the aluminum dispersion can be Jetfluid WB 21001 by ECKART GmbH or similar.

According to some embodiments, the metal powder dispersion and anti-corrosion additive can be Jetfluid WB 20001 by ECKART GmbH or similar.

Non-limiting examples of families of film-forming agents include monomers, oligomers (short chains of about 10-100 monomers), polymers and copolymers of acrylates, acrylamides and other derivatives of acrylic acid, acryl/styrene, polyethylene-glycols, urethanes and polyvinylpyrrolidones, and the likes also in the form of resin emulsions and co-emulsions. These film-forming agents can also be selected to have a relatively low $T_g$. According to some embodiments, the property-sensitive proto-elastomeric film forming agent can be an acrylic or polyurethane emulsion self-crosslinking or not self-crosslinking. Non-limiting examples of acrylic emulsion are NeoCryl® A-1120 and NeoCryl® A-1127 (commercially available from DSM) Primal Econext 15R (commercially available from DOW), REVACRYL AE 3020 (commercially available from Synthomer) and more. Non limiting examples of polyurethane emulsions are U199 and U216 (commercially available from Alberding), NeoRez® R-1007 (commercially available from DSM), ROLFLEX DV5 (commercially available from Lamberti), and more.

According to some embodiments, the humectants can be any slow evaporating solvent that is soluble in water examples are propylene glycol, ethylene glycol, 1,3-propanediol, glycerin, diethylene glycol and more.

According to some embodiments, the crosslinking agent can be one of several chemical families. Some non-limiting examples are mentioned in U.S. Pat. No. 9,611,401 by the present assignee. Additional crosslinking chemistries are blocked polyisocyanates and oxazoline polymer. Non-limiting examples of blocked polyisocyanates are BAYHYDUR® BL 5335, BAYHYDUR® BL XP 2706, IMPRAFIX® 2794 XP, BAYBOND® XL 6366, BAYBOND® XL 825, BAYBOND® XL 3674 XP (commercially available from Covestro) and more. Non-limiting examples of oxazoline polymer are EPOCROS K-2010E, EPOCROS K-2020E, EPOCROS K-2030E, EPOCROS WS-500 (commercially available from NIPPON SHOKUBAI) and more.

Also provided herein is a method and a process of direct digital inkjet printing metallic designs and decorations on textile using water-based ink compositions. As discussed hereinabove, the principles of the printing process using the metallic ink composition is based on the concepts of the multi-part ink printing process, wherein colored ink compositions are being immobilized upon interacting with an immobilizing composition on the surface of the substrate.

While reducing the present invention to practice, the present inventors have surprisingly found that the sequence of printing various parts of the multi-part ink composition affects the metallic gloss of the metallic details in the resulting design or image. Furthermore, it was found that printing the metallic ink simultaneously with a transparent colored ink composition, with or without an opaque white underbase ink composition, affords spectacular decoration effects.

According to some embodiments of the present invention, the opacity of the metallic ink composition is harnessed as an underbase for printing on non-white substrates and for augmenting other features in the design. In yet other embodiments of the invention, the metallic ink is used as a spot colored ink composition, with or without an added transparent colored pigment thereto, and with or without an opaque white underbase ink composition. Any of these processes of printing and any combination thereof results in different metallic effect.

It is expected that during the life of a patent maturing from this application many relevant processes and methods for inkjet printing of metallic decorations and images will be developed and the scope of the term "inkjet printing of metallic decorations and images" is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the phrases "substantially devoid of" and/or "essentially devoid of" in the context of a certain substance, refer to a composition that is totally devoid of this substance or, in the alternative, includes less than about 5, 1, 0.5 or 0.1 percent of the substance by total weight or volume of the composition. Alternatively, the phrases "substantially devoid of" and/or "essentially devoid of" in the context of a process, a method, a property or a characteristic, refer to a process, a composition, a structure or an article that is totally devoid of a certain process/method step, or a certain property or a certain characteristic, or a process/method wherein the certain process/method step is effected at less than about 5, 1, 0.5 or 0.1 percent compared to a given standard process/method, or property or a characteristic characterized by less than about 5, 1, 0.5 or 0.1 percent of the property or characteristic, compared to a given standard.

The term "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict. As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the terms "process" and "method" refer to manners, means, techniques and procedures for accomplishing a given task including, but not limited to, those manners, means, techniques and procedures either known to, or readily developed from known manners, means, techniques and procedures by practitioners of the chemical, material, mechanical, computational and digital arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental and/or calculated support in the following examples.

EXAMPLES

Reference is now made to the following examples, which together with the above descriptions illustrate some embodiments of the invention in a non-limiting fashion.

Example 1

In order to determine which commercially-available ink emulsion is suitable to fill the role of a property-sensitive agent, the following experiment was conducted, wherein several commercially-available emulsions were tested for coagulation upon contacting a sample of an immobilizing/wetting composition (Table 1 below).

TABLE 1

| Immobilizing/Wetting composition | |
|---|---|
| Acetic acid (as a transitory organic acid) | 2.5% |
| BYK 348 (as a wetting agent) | 0.15% |
| Water | to 100% |
| Viscosity at 34° C. | 1-2 cp |
| pH | 2.5 |
| Surface tension | 31 N/m |

A property-sensitive emulation coagulates and does not disperse in the wetting composition, while non-property-sensitive emulation would disperse in the wetting composition. The results are summarized in Table 2 presented below and FIGS. 1A-G.

FIGS. 1A-G present photographs of seven vials, each containing a wetting composition, as described herein, into which a drop of a commercially available emulsion, as described in Table 2 was placed, showing the suitability of the emulsion to serve as a property-sensitive emulsion, whereas visible coagulation indicates a suitable property-sensitive emulsion, and a dispersing emulsion indicated an non-property-sensitive emulsion.

TABLE 2

Figure 1B:
Figure 1C:
Figure 1D:
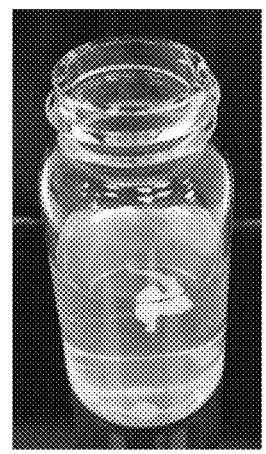
Figure 1E:
Figure 1F:
Figure 1G:
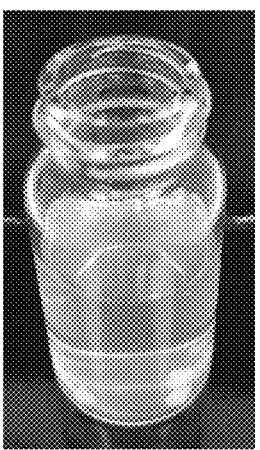

| | Manufacturer | emulsion | Chemical nature | Property-sensitive | FIG. 1x |
|---|---|---|---|---|---|
| Emulsion 1 | COVESTRO | IMPRANIL DLN-SD | Polyurethane | No | FIG. 1A |
| Emulsion 2 | ACHITEX MINERVA | FINISH PL LIQ | Polyurethane | No | FIG. 1B |
| Emulsion 3 | ALBERDINGK | AC 2403 | polyacrylic | No | FIG. 1C |
| Emulsion 4 | LAMBERTI | ROFLEX DV5 | Polyurethane | Yes | FIG. 1D |
| Emulsion 5 | ICAP-SIRA | IDROCAP 954PF | polyacrylic | Yes | FIG. 1E |
| Emulsion 6 | LAMBERTI | ROLFLEX K-80 | Polyurethane-polyacrylic hybrid | Yes | FIG. 1F |
| Emulsion 7 | STAHL | RELCA PU 406 | Polyurethane | Yes | FIG. 1G |

As can be seen in Table 2 and FIGS. 1A-G, not all emulsions were found suitable, as only Emulsions 4-7 coagulated upon contacting the wetting composition, while Emulsions 1-3 dispersed therein. The experiment demonstrates how simple and quick is the test of a putative property-sensitive emulsion, requiring no special equipment or even a printing machine.

Example 2

A proof of concept of some embodiments of the present invention, seven exemplary water-based metallic ink compositions were prepared, as presented in Table 3 below. These exemplary ink compositions, denoted "Ink 1" to "Ink 7", were formulated to be suitable for jetting ink from a Fujifilm Dimatix Q series printheads.

Pieces of black T-shirt fabric about 100×150 mm (PR-MODORO 3099) were wetted with immobilizing/wetting composition (see, Example 1) and then about 1 mL of each of Ink 1-7 was placed in at the top of the fabric piece. The ink side of the fabric was elevated to allow the ink to flow on the fabric.

TABLE 3

| Component | Ink 1 | Ink 2 | Ink 3 | Ink 4 | Ink 5 | Ink 6 | Ink 7 |
|---|---|---|---|---|---|---|---|
| Eckart Jetfluid WB 21001, aluminum powder (25%) in glycol mixture | 4% | 4% | 4% | 4% | 4% | 4% | 4% |
| Eckart Jetfluid WB 20001, alkyl ester of Phosphoric acid salt with primary amine in water | 2% | 2% | 2% | 2% | 2% | 2% | 2% |
| A mixture of propylene glycol, 1,3, propandiol, glycerin and or other glycols (as humectants) | 35% | 40% | 36% | 20% | 29% | 20% | 25% |
| Cymel 303 (amino resin crosslinking agent) | 2% | 2% | 3% | 2% | 2% | 3% | 1% |
| Nacure X49-110 (blocked acid catalyst) | %0.7 | %0.7 | %0.7 | %0.7 | %0.7 | %0.7 | %0.7 |
| Diethanolamine (buffering agent) | 0.1% | | 0.1% | 0.1% | 0.1% | 0.1% | |
| 2-amino-2-methylpropanol (buffering agent) | | 0.1% | | | | | 0.1% |
| BYK 024 (as an anti-foaming agent) | %0.2 | %0.2 | %0.2 | %0.2 | %0.2 | %0.2 | %0.2 |
| Acticide MBS (as a bacteriocide and fungicide) | 0.2% | 0.2% | 0.2% | 0.2% | 0.2% | 0.2% | 0.2% |
| BYK 348 (as a wetting agent/surfactant) | 0.1% | 0.1% | 0.1% | 0.1% | 0.1% | 0.1% | 0.1% |
| Dispex A40 (as property-sensitive proto-elastomeric film-forming acrylic dispersant) | 5% | 5% | 5% | | | | |
| Emulsion 1 | 40% | | | | | | |
| Emulsion 2 | | 40% | | | | | |
| Emulsion 3 | | | 45% | | | | |
| Emulsion 4 | | | | 57% | | | |
| Emulsion 5 | | | | | 57% | | |
| Emulsion 6 | | | | | | 57% | |
| Emulsion 7 | | | | | | | 50% |
| Water | 10.7% | 5.7% | 3.7% | 13.7% | 4.7% | 12.7% | 16.7% |
| Viscosity at 28° C. (cP) | 20-18 | 20-17 | 18-15 | 13-12 | 20-16 | 13-12 | 17-14 |
| pH adjusted to | 7.5-9 | 7.5-9 | 7.5-9 | 7.5-9 | 7.5-9 | 7.5-9 | 7.5-9 |
| Surface tension (mN/m) | 24 | 26 | 25 | 25 | 24 | 26 | 25 |

FIGS. 2A-G present photographs of pieces of black cotton fabric which were wetted with an immobilizing composition and then dotted with 1 mL of an aqueous metallic ink composition, according to some embodiments of the present invention, which was allowed to flow over the fabric at an angle, wherein the ink composition is presented in Table 3, and the type of property-sensitive emulsion is presented in Table 2.

As can be seen in FIGS. 2A-G, the samples denoted "Ink 1", "Ink2" and "Ink 3" did not show metallic luster, while each of the samples denoted "Ink 4", "Ink 5", "Ink 6" and "Ink 7" showed an acceptable level of metallic luster, as assessed visually.

Example 3

The metallic ink compositions presented herein were tested for the luster and flop index afforded when printed on a black fabric substrate. The flop index is the measurement of the change in reflectance of a metallic color as it is rotated through the range of viewing angles. A flop index of 0 indicates a solid color, an acceptable flop index expected from a metallic ink on a dark substrate ranges from 2-10, while a very high flop metallic basecoat color on a solid bright substrate may reach a flop index of 15-17.

A wetting composition as shown in Table 1, an opaque white under base composition as presented in Table 4 below, and an exemplary aqueous metallic ink composition, according to some embodiments of the present invention, referred to herein as "Ink 3" and "Ink 7" of the above Example 2, were uploaded to an "Avalanche Hexa" digital printing machine manufactured by Kornit Digital Ltd., Israel.

TABLE 4

| | |
|---|---|
| Property sensitive film-forming acrylic binder (Acrylic emulsion $T_g$ −20° C.); Appretan E 6200 | 37% |
| Opaque white pigment (titania) | 18% |
| Humectants mixture (propylene glycol, diethylene glycol, glycerin and or other glycols) | 37% |
| Pigment dispersant; TEGO 750 | 3.2% |
| Anti-foaming agent; BYK 024 | 0.2% |
| Buffering agent (diethanolamine) | 0.2% |
| Wetting agent/Surfactant; BYK 348 | 0.1% |
| Crosslinking agent (amino resin) Cymel 303 | 3% |
| Curing catalyst (blocked acid); Nacure 2448 | 0.5% |
| Bacteriocide/fungicide; Acticide MBS | 0.1% |
| Water to QS | to 100% |
| Viscosity at 34° C. (at shear force of 4000 sec$^{-1}$) | 13 cp |
| pH | 8.5 |
| Surface tension | 34 N/m |

The printing machine was equipped with 8 Fujifilm Dimatix Q series printheads with 35 pL nominal drop volume in four rows and two printheads for each color. The prints were made at a resolution of 600×1200 dpi "double pass", resulting in about 0.046 grams per square inch of ink for 100% coverage. The printed image for each of the inks was a pattern of side-by-side stripes on a black cotton fabric (PROMODORO 3099), going from a coverage level of 10% on the right side of the pattern, to a coverage level of 100% on the left in increments of 10% increase per stripe.

FIGS. 3A-B present photographs of two pieces of black cotton fabric, having a 10-stripe pattern of an exemplary metallic ink composition, according to some embodiments of the present invention, "Ink 3" (FIG. 3A) and "Ink 7" (FIG. 3B) (also see Table 3), going from 10% substrate coverage on the right to 100% substrate coverage on the left in 10% increments.

The flop index for each coverage level for each ink sample was measured using X-Rite multi-angle spectrophotometer MA94, and the results are summarized in Table 5.

TABLE 5

| Coverage level (%) | Flop index afforded for Ink 3 (FIG. 3A) | Flop index afforded for Ink 7 (FIG. 3B) |
|---|---|---|
| 100 | 0.79 | 7.32 |
| 90 | 0.59 | 5.98 |
| 80 | 0.44 | 5.42 |
| 70 | 0.20 | 4.65 |
| 60 | 0 | 4.39 |
| 50 | 0 | 2.93 |
| 40 | 0 | 2.41 |
| 30 | 0 | 0.47 |
| 20 | 0 | 0 |
| 10 | 0 | 0 |

As can be seen in FIGS. 3A-B and Table 5, a correlation was observed between the metallic effect afforded by Ink 3 and Ink 7 (see, Example 2 hereinabove), and the metallic luster and flop index of the printed inks.

Example 4

The following example was carried out to study the effect of the sequence of printing various colored inks on the metallic effect in the resulting image. Exemplary colored (CMYK) ink compositions, comprising a property-sensitive proto-elastomeric film-forming agent, were prepared based on the formulation of Ink 7 (see, Table 3 in Example 2, presented hereinabove), while replacing the aluminum powder and suspension additive with a pigment concentrate, such as Cabbojet 260 series (20% pigment in water).

The various parts of the multi-part ink composition, namely the metallic ink composition Ink 7, the CMYK colored ink compositions, the opaque which underbase composition and the immobilizing composition, were loaded on an "Avalanche Hexa" digital printing machine manufactured by Kornit Digital Ltd., Israel. The machine was equipped with 8 Fujifilm Dimatix Q series printheads in four rows and two printheads for each composition (part).

The digital prints were afforded at a resolution of 600× 1200 dpi for all compositions, using about 0.1 grams per square inch of white underbase and 0.023 grams per square inch of all other metallic and colored ink compositions to afford a 100% area coverage. Three images were printed on black T-shirt fabric (PROMODORO 3099), allowed to cure for six minutes at 160° C. in a forced hot air dryer, photographed, and are presented as FIG. 4, FIG. 5 and FIG. 6.

Figure 4:
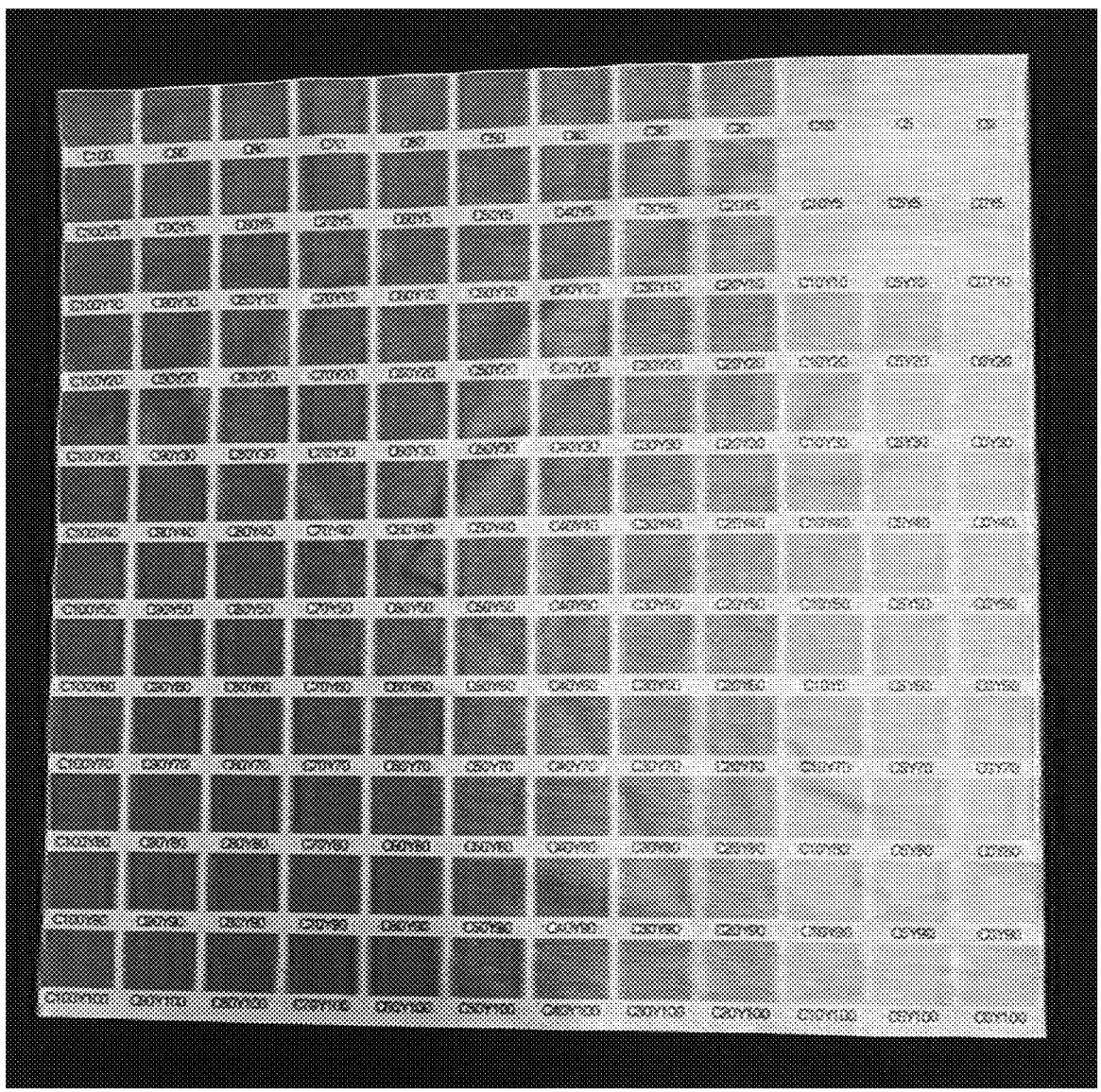
FIG. 4 presents a color photograph of an image printed on black cotton fabric using an immobilizing composition that was sprayed in an amount of 0.5 grams per square inch, followed by printing a square of 320×320 mm of the opaque white underbase composition at 60% coverage, followed by printing Ink 4 over the same area to afford 100% coverage, flowed by printing thereon cyan and yellow simultaneously in a pattern of 144 25×20 mm squares where cyan was printed at a decreasing coverage of 100%, 90%, 80%, 70%, 60%, 50%, 40%, 30%, 20%, 10%, 5%, 0% from left to right, and yellow was printed at an increasing coverage of 100%, 90%, 80%, 70%, 60%, 50%, 40%, 30%, 20%, 10%, 5%, 0% from top to bottom.

FIG. 4 presents a color photograph of an image printed on black cotton fabric using an immobilizing composition that was sprayed in an amount of 0.5 grams per square inch, followed by printing a square of 320×320 mm of the opaque white underbase composition at 60% coverage, followed by printing Ink 7 over the same area to afford 100% coverage, and finally flowed by printing thereon cyan and yellow simultaneously in a pattern of 144 25×20 mm squares where cyan was printed at a decreasing coverage of 100%, 90%, 80%, 70%, 60%, 50%, 40%, 30%, 20%, 10%, 5%, 0% from left to right, and yellow was printed at an increasing coverage of 100%, 90%, 80%, 70%, 60%, 50%, 40%, 30%, 20%, 10%, 5%, 0% from top to bottom.

Figure 5:
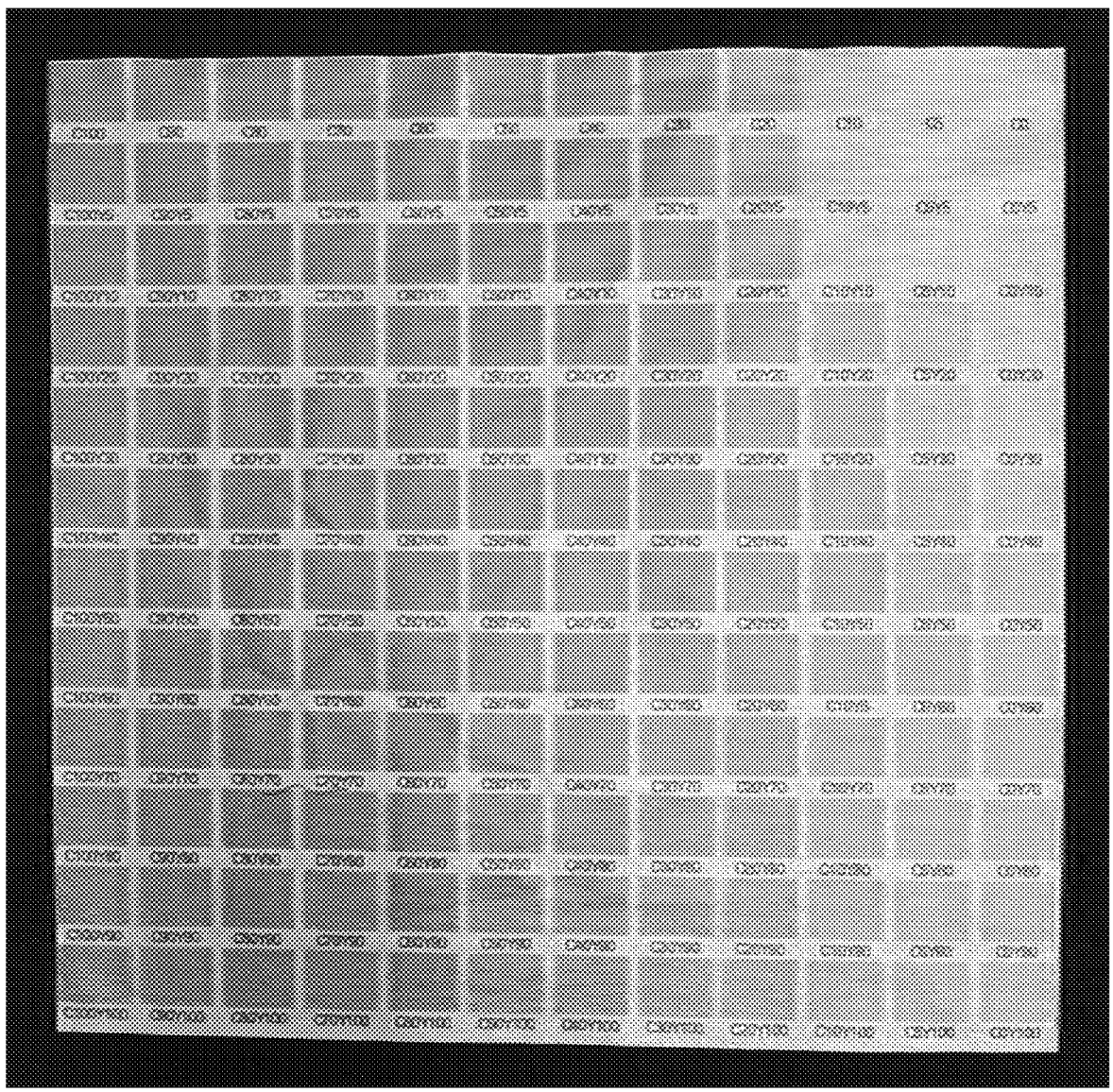
FIG. 5 presents a color photograph of an image printed on black cotton fabric using an immobilizing composition that was sprayed in an amount of 0.5 grams per square inch, followed by printing a square of 320×320 mm of the opaque white underbase composition at 60% coverage, followed by printing over the same area Ink 4 at a 100% coverage density, and cyan and yellow, all three simultaneously, in a pattern of 144 25×20 mm squares, where cyan was printed at a decreasing coverage of 100%, 90%, 80%, 70%, 60%, 50%, 40%, 30%, 20%, 10%, 5%, 0% from left to right, and yellow was printed at an increasing coverage of 100%, 90%, 80%, 70%, 60%, 50%, 40%, 30%, 20%, 10%, 5%, 0% from top to bottom.

FIG. 5 presents a color photograph of an image printed on black cotton fabric using an immobilizing composition that was sprayed in an amount of 0.5 grams per square inch, followed by printing a square of 320×320 mm of the opaque white underbase composition at 60% coverage, followed by printing over the same area Ink 7 at a 100% coverage density, and cyan and yellow, all three simultaneously, in a pattern of 144 25×20 mm squares, where cyan was printed at a decreasing coverage of 100%, 90%, 80%, 70%, 60%, 50%, 40%, 30%, 20%, 10%, 5%, 0% from left to right, and yellow was printed at an increasing coverage of 100%, 90%, 80%, 70%, 60%, 50%, 40%, 30%, 20%, 10%, 5%, 0% from top to bottom.

Figure 6:
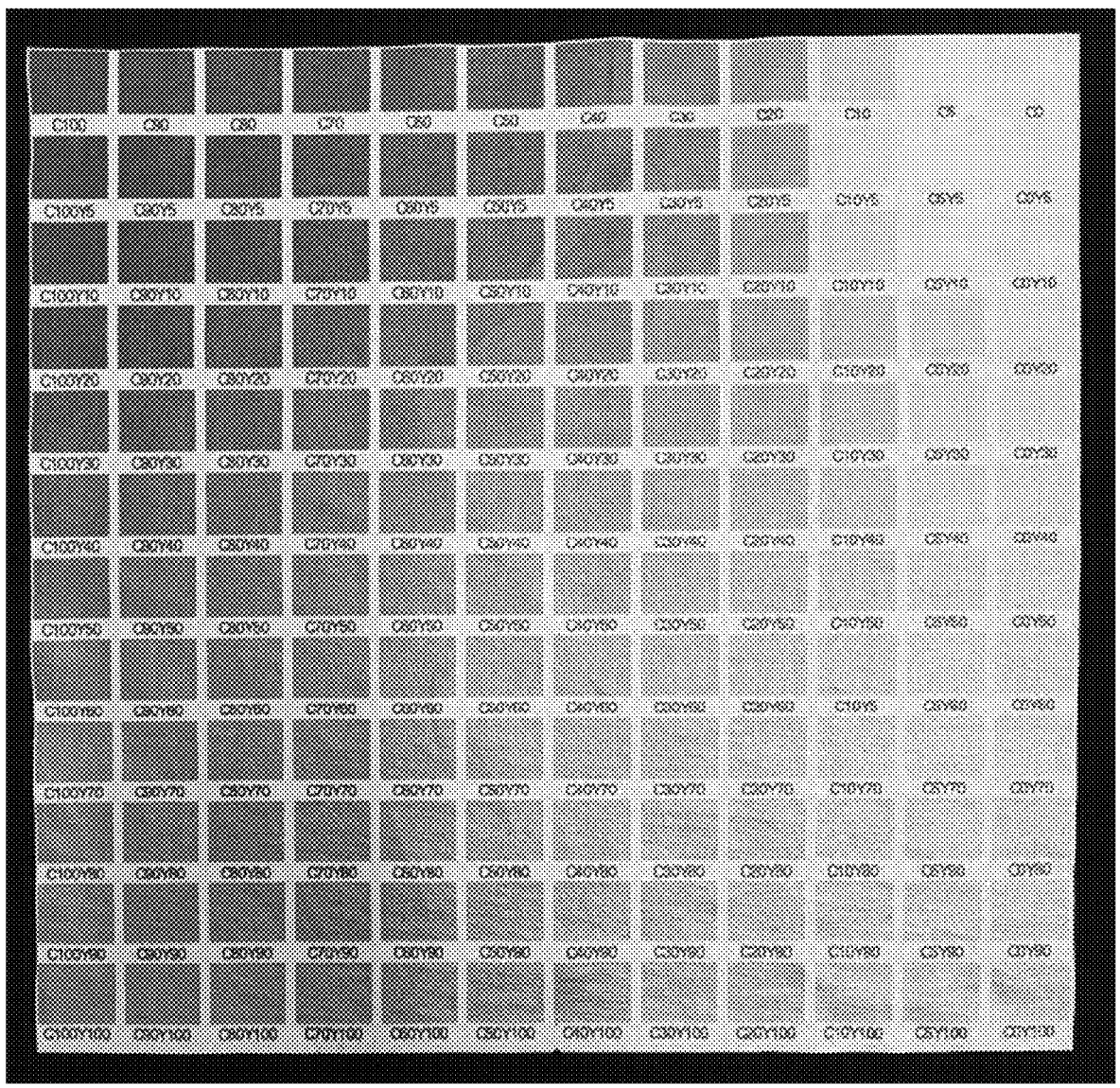
FIG. 6 presents a color photograph of an image printed on black cotton fabric using an immobilizing composition that was sprayed in an amount of 0.5 grams per square inch, followed by printing a square of 320×320 mm of the opaque white underbase composition at 60% coverage, followed by printing cyan in a pattern of 12 identical rows of 25×20 mm squares at a decreasing coverage of 100%, 90%, 80%, 70%, 60%, 50%, 40%, 30%, 20%, 10%, 5%, 0% from left to right, followed by printing Ink 4 in a pattern of 12 identical rows of 25×20 mm squares at an increasing coverage of 100%, 90%, 80%, 70%, 60%, 50%, 40%, 30%, 20%, 10%, 5%, 0% from top to bottom.

FIG. 6 presents a color photograph of an image printed on black cotton fabric using an immobilizing composition that was sprayed in an amount of 0.5 grams per square inch, followed by printing a square of 320×320 mm of the opaque white underbase composition at 60% coverage, followed by printing cyan in a pattern of 12 identical rows of 25×20 mm squares at a decreasing coverage of 100%, 90%, 80%, 70%, 60%, 50%, 40%, 30%, 20%, 10%, 5%, 0% from left to right, followed by printing Ink 7 in a pattern of 12 identical rows of 25×20 mm squares at an increasing coverage of 100%, 90%, 80%, 70%, 60%, 50%, 40%, 30%, 20%, 10%, 5%, 0% from top to bottom.

As can be seen in FIGS. 2A-4, all three printing processes gave different metallic effect. When printing the colored ink compositions on top of the metallic ink (FIG. 4) the resulting colors were very bright and shiny, while printing the color and metallic ink simultaneously (FIG. 5) resulted in a more matte effect, similar to unpolished metal casts. When printing the metallic ink on top of the colored ink (FIG. 6), the resulting colors are less shiny compared to printing colors on top on the metal ink, but shinier then when printing the inks simultaneously, giving a "smoked"/semitransparent metallic effect.

Example 5

The following example was carried out to study the effect of printing density of the metallic ink on the metallic effect and the wash-fastness of the resulting image. An image of was printed in two copies using the same compositions and process as presented herein above.

An image was printed on black cotton fabric using an immobilizing composition that was sprayed in an amount of 0.5 grams per square inch, followed by printing a square of 300×300 mm using the opaque white underbase composition at 70% coverage, followed by printing a pattern of 10 rectangles of 300×30 mm using Ink 7 at coverages of 100%, 90%, 80%, 70%, 60%, 50%, 40%, 30%, 20% and 10% on top of the white underbase layer.

The fabric having the above-described image was subjected to five consecutive wash cycles in a household laundry machine (Siemens business edition 6 kg 1226 washer) with Persil laundry detergent at cotton setting, 40° C. 1000 RPM, followed by hang drying. The image on the washed fabric was compared to the unwashed image to study effect of printing density and washes on the metallic luster. The change of color was assessed by "AATCC EP-7 Instrumental Assessment of the Change in Color of a Test Specimen" using X-Rite i1pro spectrophotometer and i1 profiler software, and the results are shown in Table 6 below.

TABLE 6

| Ink 7 percent coverage | GS |
|---|---|
| 10 | 4.5 |
| 20 | 4 |
| 30 | 4 |
| 40 | 4.5 |
| 50 | 4 |
| 60 | 5 |
| 70 | 4 |
| 80 | 4 |
| 90 | 4.5 |
| 100 | 4.5 |

As can be seen in Table 6, some loss of luster was observed at all ink coverage levels.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A process of printing a metallic element in an image on a substrate, comprising:
applying on the substrate by a first printhead an aqueous immobilizing composition that comprises a property-adjusting agent,
digitally applying by a second printhead an aqueous metallic inkjet composition, said aqueous metallic inkjet composition comprises a property-sensitive proto-elastomeric film-forming agent, said property-adjusting agent causes said aqueous metallic inkjet composition to coagulate, and
digitally applying by a third printhead an aqueous transparent colored inkjet composition on top of said aqueous metallic inkjet composition,
wherein:
digitally applying said aqueous transparent colored inkjet composition is effected simultaneously with digitally applying said aqueous metallic inkjet composition;
said aqueous immobilizing composition is essentially devoid of a film-forming agent; and
said aqueous transparent colored inkjet composition comprises a pigment.

2. The process of claim 1, wherein the substrate is stretchable and/or flexible substrate, said aqueous metallic inkjet composition further comprises at least one emulsified proto-elastomeric film-forming agent, such that said aqueous metallic inkjet composition forms a film upon curing that is characterized by a glass transition temperature ($T_g$) that ranges from −35° C. to 0° C., said at least one emulsified proto-elastomeric film-forming agent is said property-sensitive proto-elastomeric film-forming agent or a different ingredient.

3. The process of claim 1, wherein the substrate is stretchable and/or flexible substrate, said aqueous transparent colored inkjet composition comprises at least one emulsified proto-elastomeric film-forming agent, such that said aqueous transparent colored inkjet composition forms a film upon curing that is characterized by a glass transition temperature ($T_g$) that ranges from −35° C. to 0° C.

4. The process of claim 1, wherein the substrate is non-white, the process further comprising, prior to said digitally applying said aqueous metallic inkjet composition, digitally applying an aqueous opaque underbase inkjet composition on the substrate, and effecting said digitally applying said aqueous metallic inkjet composition over said aqueous opaque underbase inkjet composition.

5. The process of claim 4, wherein the substrate is stretchable and/or flexible substrate, said aqueous opaque underbase inkjet composition comprises at least one emulsified proto-elastomeric film-forming agent, such that said aqueous opaque underbase inkjet composition forms a film upon curing that is characterized by a glass transition temperature ($T_g$) that ranges from −35° C. to 0° C.

6. The process of claim 4, wherein said aqueous opaque underbase inkjet composition comprises at least one property-sensitive agent, such that said property-adjusting agent causes said aqueous opaque underbase inkjet composition to coagulate.

* * * * *